United States Patent [19]

Stutler

[11] Patent Number: 5,172,824
[45] Date of Patent: Dec. 22, 1992

[54] TRASH ORGANIZER FOR RECYCLING

[76] Inventor: Mark Stutler, Rte. 3, Box 150E, Hurricane, W. Va. 22526

[21] Appl. No.: 669,087

[22] Filed: Mar. 15, 1991

[51] Int. Cl.$^5$ ............................................. B65F 1/06
[52] U.S. Cl. ................................. 220/404; 220/909; 220/505; 248/101; 209/930
[58] Field of Search .................. 232/43.1, 43.2, 43.5; 312/212, 330.1, 60, 121; 209/702, 930, 933; 220/909, 404, 505, 23.83, 4.26, 558, 331, 908; 248/101, 99, 97

[56] References Cited

U.S. PATENT DOCUMENTS

| Number | Date | Name | Ref |
|---|---|---|---|
| 745,693 | 12/1903 | Tobey | 220/558 |
| 1,809,317 | 6/1931 | Snyder | 248/101 |
| 2,301,032 | 11/1942 | Fielding | 220/404 |
| 2,625,973 | 1/1953 | Weldon et al. | 220/404 |
| 2,669,994 | 2/1954 | Straubel | 220/558 |
| 2,775,334 | 12/1956 | Jeremiah | 198/406 |
| 3,130,853 | 4/1964 | Colthurst et al. | 2290/404 |
| 3,314,632 | 4/1967 | Freuler | 248/101 |
| 3,529,766 | 9/1970 | Mott, Sr. et al. | 248/99 |
| 3,893,615 | 7/1975 | Johnson | 220/404 |
| 3,980,196 | 9/1976 | Paulyson et al. | 220/1.5 |
| 4,238,868 | 12/1980 | Sternberg | 248/101 |
| 4,445,430 | 5/1984 | Pyne et al. | 209/702 |
| 4,613,104 | 9/1986 | Garrott | 248/97 |
| 4,660,758 | 4/1987 | Tavel et al. | 209/933 |
| 4,893,722 | 1/1990 | Jones | 220/23.83 |
| 4,913,308 | 4/1990 | Culbertson | 220/908 |
| 4,941,653 | 7/1990 | Sterner, Jr. | 220/404 |
| 4,979,705 | 12/1990 | Bocitz | 248/99 |

FOREIGN PATENT DOCUMENTS

| | | | |
|---|---|---|---|
| 969229 | 9/1964 | United Kingdom | 248/101 |
| 1494835 | 12/1977 | United Kingdom | 248/101 |
| 9014282 | 11/1990 | World Int. Prop. O. | 220/404 |

Primary Examiner—Stephen Marcus
Assistant Examiner—S. Castellano
Attorney, Agent, or Firm—Jim Zegeer

[57] ABSTRACT

A trash organizer for recycling of items makes trash sorting easy and encourages and reminds people to be environmentally concerned. The organizer includes a main frame container or housing having a plurality of individual containers carried in the main container with the individual containers being adapted to receive a particular category of refuse including glass, plastic, metal cans or paper. The container for receiving metal cans includes a cover having a hole therein of a predetermined size for receiving, for example, beverage cans and includes a self-stacking arrangement to maximize given space and a sliding rear door and clips for making emptying the cans easy. A section is provided for receiving general trash includes a set of plastuic bag retaining frames which slides into the unit. A bottle drawer is provided which allows easy access at low elevation and includes rubber stops and pads to prevent breakage of glass. The housing or frame is mounted on casters for easy mobility.

4 Claims, 5 Drawing Sheets

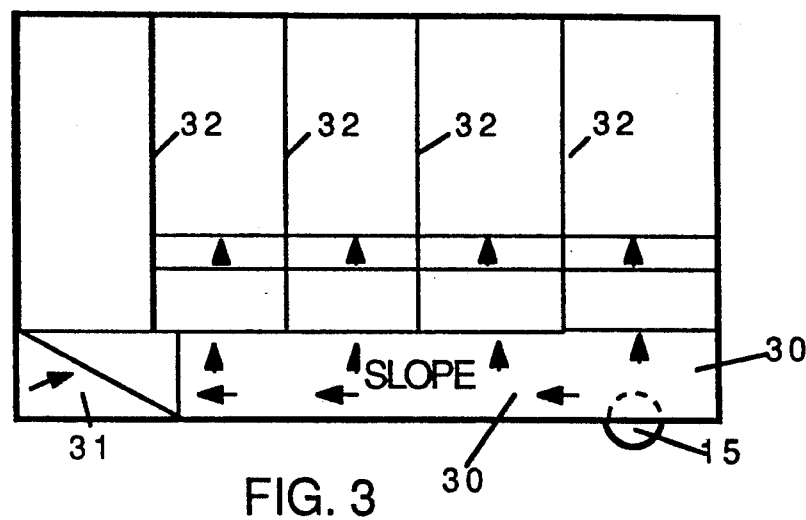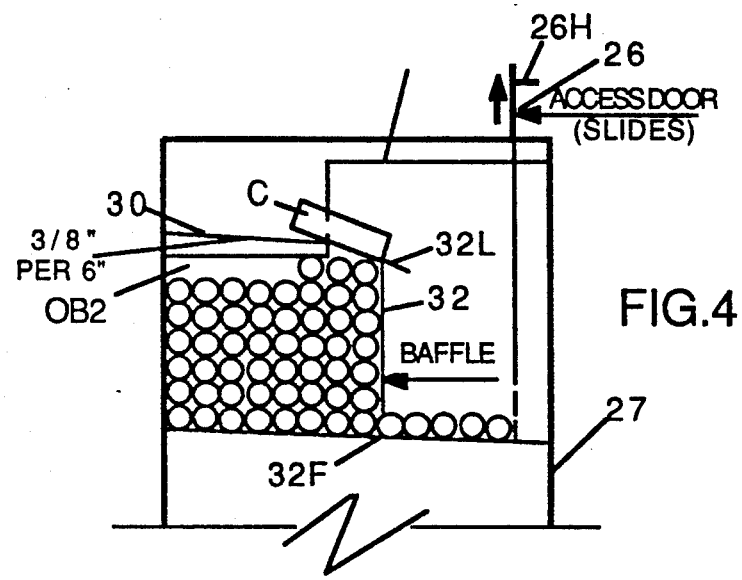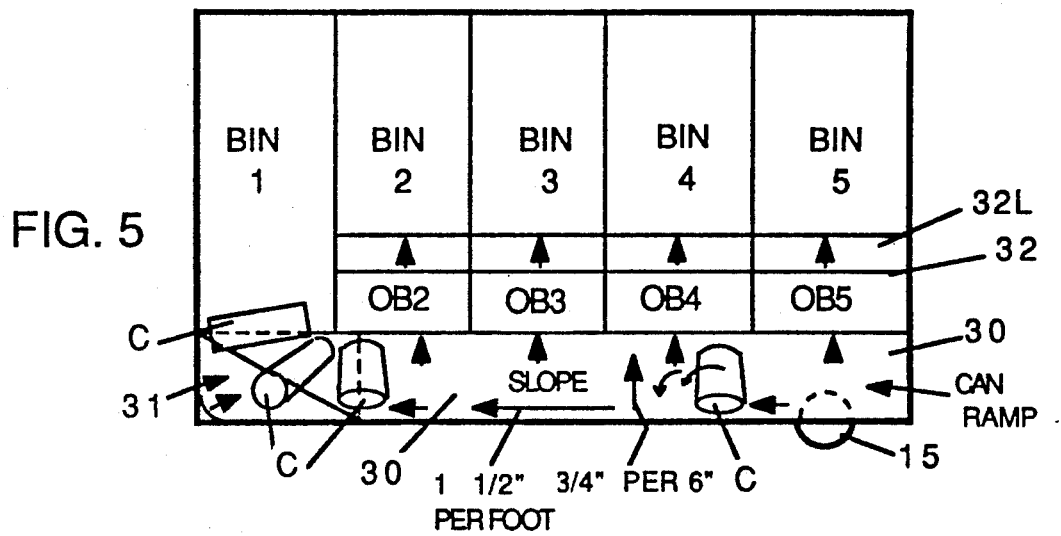

TRASH ORGANIZER FOR RECYCLING

BACKGROUND AND BRIEF DESCRIPTION OF THE INVENTION

There is currently public awareness of the importance of recycling of cans, bottles, newspapers and the like to better protect the environment. Many systems have been devised to sort trash but these usually encompass separate containers for glass, plastic, metal cans, etc.

The present invention provides a trash organizer of recycleable items and makes trash sorting easy and encourages as well as reminds people to be environmentally concerned. The trash organizer of the present invention may be converted to sort and store most all recycleable trash items or goods. A trash organizer according to the invention which uses a tower or vertically arranged stack of individual storage spaces or volume bins housed in a common frame or housing so as to provide space saving design and a neater appearance. For metal cans, particularly beverage containers (which makes up the large bulk of these categories of trash items near vending machines, etc.), a self-stacking can feature is provided which maximize the given space. A sliding rear door and bag clips makes emptying the self-stacking can storage simple and easy.

For general trash, a plastic trash bag frame maintains a plastic trash bag open so that when the trash door is open the trash may be simply dumped into the bag and it makes for easy removal and pulling out of the filled trash bags. A feature of the invention is that the can storage area or volume is above the trash bag matter which is maintained open to receive liquid draining from the cans. A bottle drawer is provided which provides easy access at a low elevation. A rubber stop and pad prevents breaking of glass and a foot operated lever is provided for foot operation (e.g. hand free) of the bottled drawer. Finally, the trash organizer of this invention is mounted on casters or rollers for easy mobility.

DESCRIPTION OF THE DRAWINGS

The above and other objects, advantages and features of the invention will become more apparent when considered with the following specification and accompanying drawings wherein:

FIG. 3 is a plan view of the can storage bin, FIG. 4 is a sectional view through the can bin storage, FIG. 5 is a plan view of the can bin storage showing the movement and path of the cans therein, FIG. 8 is a front elevational view showing the trash compartment which has been separated or bifurcated for storing trash and styrofoam cups and the like, FIG. 9 is a perspective view of a modification showing a further storage space on the top of the vertical aligned unit for storing newspapers and the like.

DETAILED DESCRIPTION OF THE INVENTION

Figure 1:
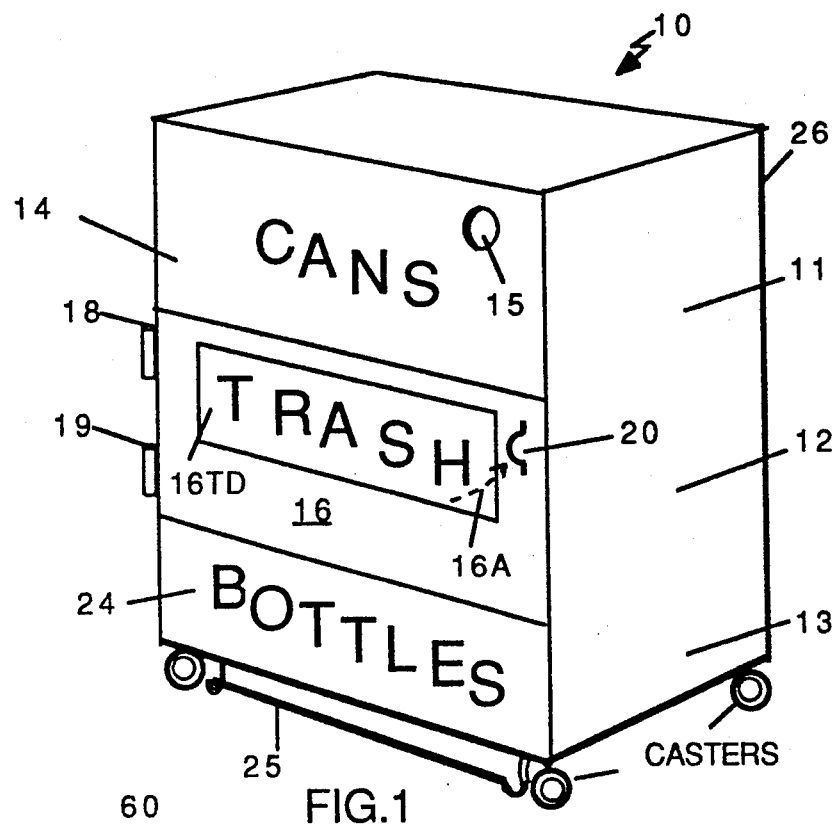
FIG. 1 is an isometric perspective view of a trash organizer for recycling purposes incorporating the invention.

Referring to FIG. 1, a trash organizer incorporating the invention comprises a generally rectangular housing 10 which, may be constructed of metal, fiberglass, plywood, or a combination of these materials and includes in this embodiment, three vertically stacked storage areas or volumes 11, 12 and 13 for metal cans, general trash and bottles, respectively. This vertical arrangement is a space saving design and provides a neater appearance as compared to a cluster of cans spaced laterally or taking up horizontal space. The design shown is particularly useful for public facilities such as medical centers, government office buildings, lunch rooms where the food and drinks may be dispensed from vending machines, schools, etc. Each of the storage areas or volumes includes a large sign or indicia (pictures of cars, bottles, etc.) indicative of the particular trash category to be sorted by storage therein. In other words, the sorting is done by each individual using the particular facility and the signs are large enough to make it clear to the users where the cans, general trash and bottles are to be placed.

Figure 6A:
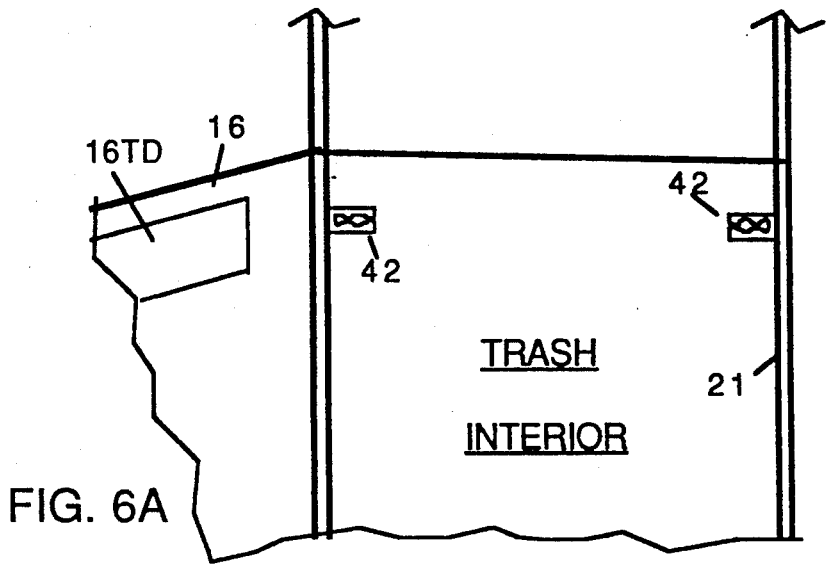
FIGS. 6a, 6b and 6c are details of the trash storage unit, FIG. 6a being a sectional view, FIG. 6b being an illustration of the side runners and the detail of the rigid wire rod trash bag frame, and FIG. 6c being a diagrammatic illustration of the trash bag mounted on a trash bag frame.

The metal can storage section 11 includes a front cover 14 which has a hole 15 of a predetermined size for receiving a metal can, such as a beverage can so that the can is received and automatically oriented on its side. Thus, a can placed in hole 15 is oriented on its side and, as will be described more fully hereinafter, will automatically self-stack to thereby maximize cans stored in the given space 11 for storage of cans. Trash storage space 11 is provided with a door 16 which is provided with hinges 18, 19 and a handle 20 and a door latch 21 (FIG. 6a). A plastic trash bag 22 (FIG. 6c) is maintained in an open position by a rigid wire frame 22. A hinged trash door 16TD is pushed in the direction of the arrow 16A, so trash may be deposited into the trash bag 22 by the user. The hinged door 16TD is gravity or spring loaded (not shown) so as to maintain the trash door 16TD closed.

The bottle storage space 13 is provided with a spring hinged door 24 and a foot operating lever 25 so that the user by placing one foot on foot operating level 25 tilts the bottle door 25 open and, as illustrated and described later in connection with FIG. 7c, safely receives glass bottles and the like for storage. Bottle storage space 13 is provided with a plastic trash bag 13TB which is held in place by clips 13C. The storage space 11 for the metal cans is provided with a rear sliding door 26 (see FIG. 4) to provide access for removal of the metal cans from the metal can storage area 11. A pair of trash bag clips 27 are provided along the bottom of the floor 28 of the metal can storage area 11 so that the cans may be removed directly into a trash bag held open by the trash bag clips 27 when door 26 has been opened.

Referring now to FIGS. 3, 4 and 5, a ramp 30 which slopes downwardly from right to left in regards to the can opening or hole 15 to cause the can C to automatically roll down the ramp 30. A slope of about 1¼" per foot is usually adequate, but larger or smaller slopes may be used. At the left end of ramp 30 (FIG. 5), a corner slope or bank 31 causes the can C to turn 90 degrees and drop into bin 1. Ramp 30 is also sloped from front to rear (about ¾" for 6") so that when bin 1 becomes full, the can C will start filling the second bin by falling into the opening $OB_2$ for bin 2, which makes the cans turn 90 degrees as it falls. The upper edge UE of baffle wall 32 which initially prevents the cans from filling up the rear (right side of baffle 32 in FIG. 4) until the front side (left side of baffle 32 in FIG. 4). The floor 32F is sloped to allow the initial larger of cans roll under baffle 32. When the left side has filled with cans, the uppermost can bridges opening $OB_2$ and roll over lip 32L into the rear of bin 2 and fill same. After bin 2 is filled, the cans are then directed to fill bin 3, first through opening $OB_3$ and then over lip 32L. The ramp angles set forth above provide the gravity forces used to orient the cans by turning them 90 degrees. The baffle wall 32, shown in section, makes the can go under the ramp 30 and under the wall and will eventually clog causing cans to stack under the ramp which will fill and then push into the bin. Thus, the cans are automatically oriented and in the same longitudinal direction in the bins. Most people hold a can with the opening up, and this is usually the first portion of the can pushed through hole 15, so the cans will be oriented in that way also.

As shown in FIG. 4, access is provided by a vertically sliding access door 26 which has a handle 26H. It will be noted that the floor 33 of the metal can bin or storage space 11 is foraminous shaped so as to permit any excess fluid that may remain in the cans to drain into trash bag 22 which has been maintained open by the wire frame 23. Thus, one of the advantages of having the storage bin for cans above the trash unit is to receive these excess fluids that may remain in the beverage containers, for example.

Figure 6B:
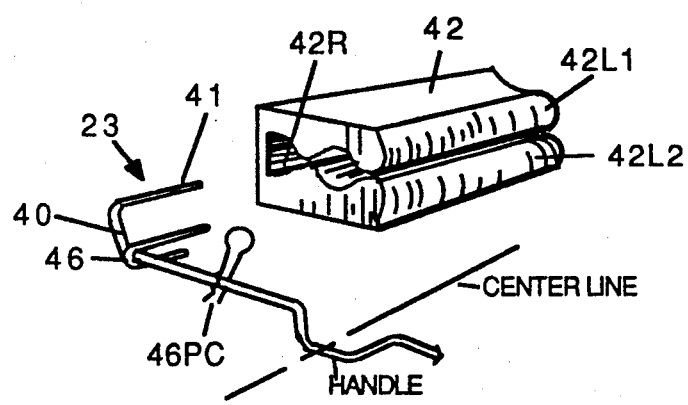
Figure 6C:
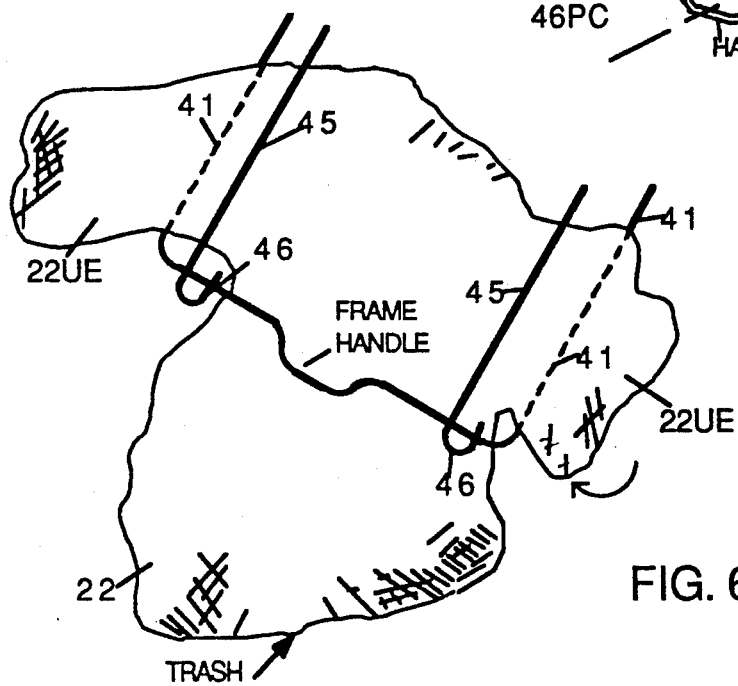

Referring now to FIGS. 6a, 6b and 6c, the trash storage space 12 is provided with a wire trash bag frame 23 which includes a continuous, generally rectangular rigid wire frame 40 having left and right side rails 41 which are received in left and right guide tracks 42 of slide racks 42R. As shown in FIG. 6c, left and right wire locking rods or bales 45 have end hoops or loops 46 so that they may be moved or slid laterally outwardly on front and rear bars of frame 10 to secure plastic trash bags, and as indicated in FIG. 6c, the upper edges 22UE of the plastic trash bag are wrapped under the locking rods or bales 45 and the smoothly curved lips 42L1 and 42L2 of guide rails 42 securely maintain the trash bags in an open condition for receipt of trash and and fluids that may be drained from the metal cans in metal storage unit 11. As shown in FIG. 6b, plastic or metal clips 46PC may be used to maintain the leading edge or forward and trailing edges of the plastic bag in an open position on wire frame 23.

Figure 7A:
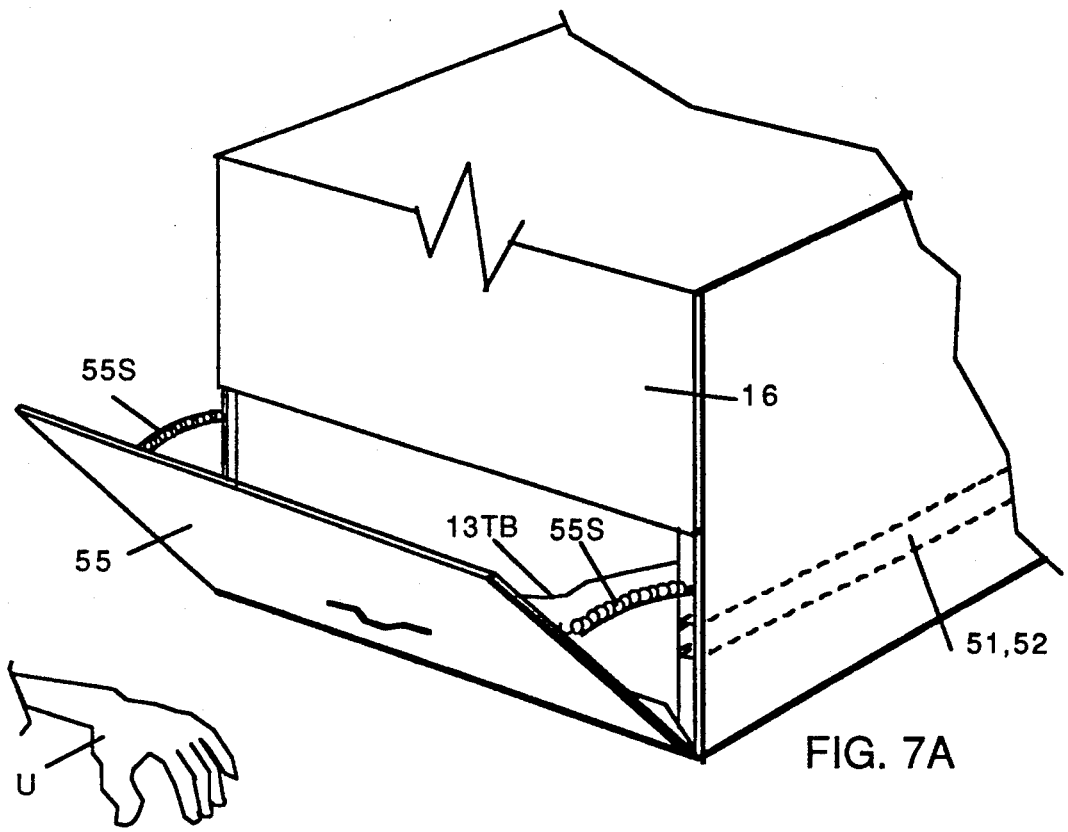
FIG. 7a is a perspective view looking down on the bottled trash drawer showing its opening.
Figure 7B:
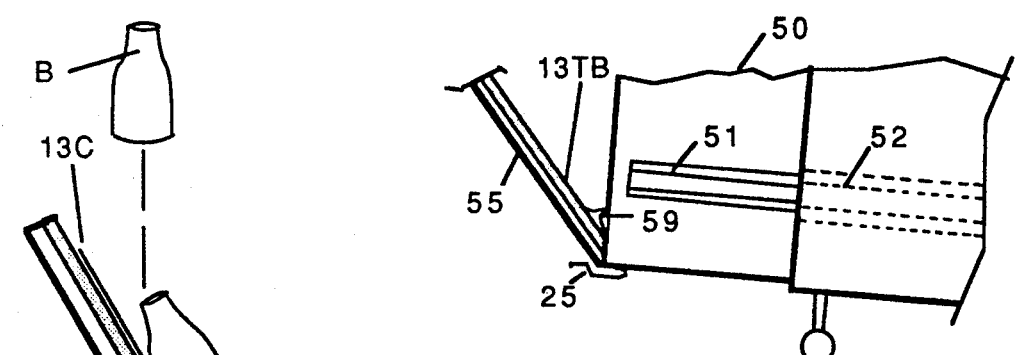
FIG. 7b is a side elevational view showing the bottled drawer being opened and pulled out for emptying.
Figure 7C:
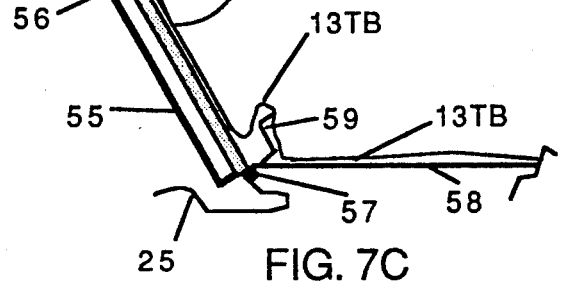
FIG. 7c is a diagrammatic illustration of the operation of dropping the bottles into the bottle drawer and how the bottles are protected from being broken.

Referring now to FIGS. 7a and 7b, bottle drawer or storage space 13 includes a sliding drawer 50 having slides 51 on the sides of the door and coacting slides 52 on the sides of housing 10. A plastic bag is maintained open by a plurality of spring bag clips 13C. Bottle drawer has a front door 55 which is opened by a foot pedal 25 and closed by springs 55S. The inside surface of door 55 is provided with a foam pad 56 and is hinged at 57 to the lower edge of trash organizer 10. A rubber stop 59 extends across the bottom wall 58. The trash bag 13TB is thin and lays over stop 59. As indicated in FIG. 7c, when a bottle B is dropped by a user U who is holding the door 55 open by his foot on foot pedal 25, bottle B will strike a padded wall 55 and/or engage rubber stop 59 (via the plastic trash bag 13TB) and fall into the bag 13TB in padded drawer 50. Thus, glass bottles and the like are protected from breaking by having their energy of impact absorbed by pad 55 and rubber stop 59.

Figure 8:
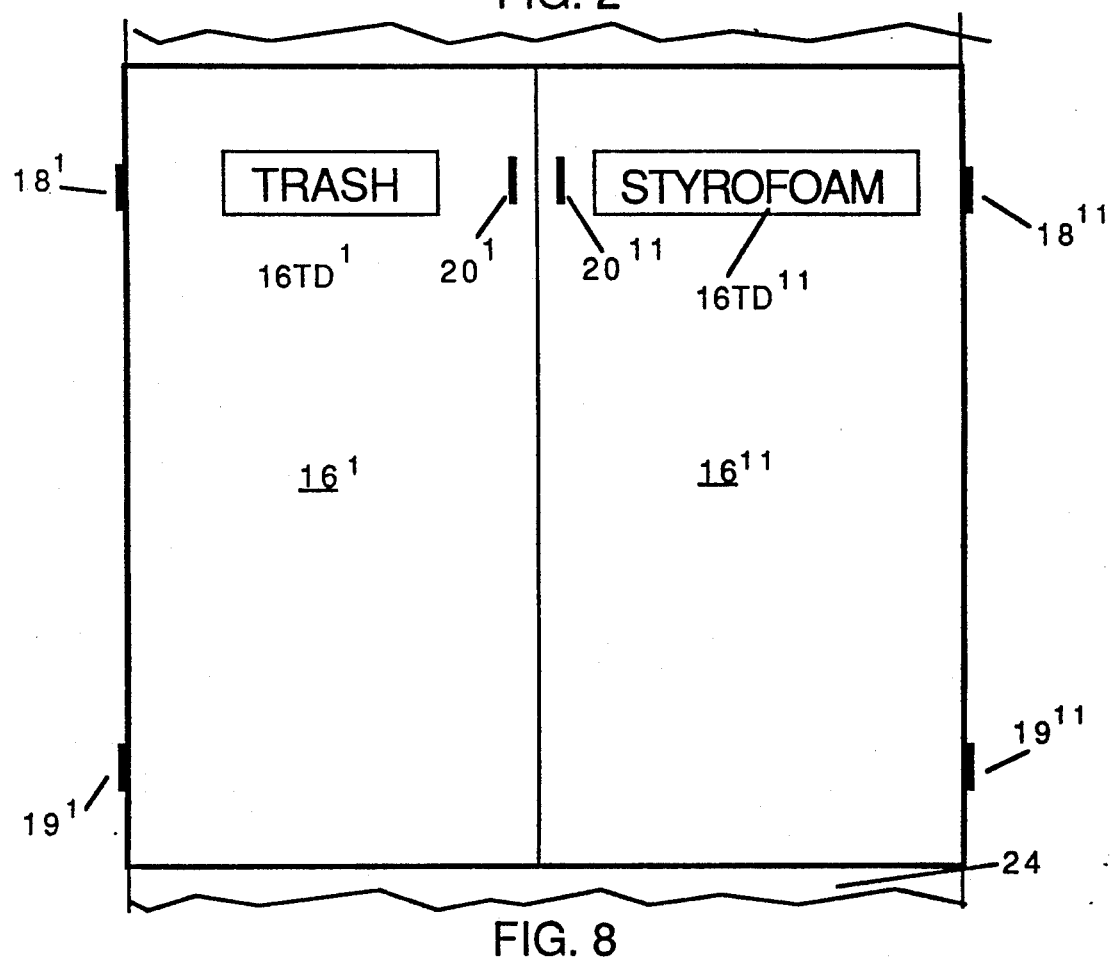

Referring now to FIG. 8, the trash storage area 11 may be divided into storage for trash generally and styrofoam cups which, where coffee and other beverages are served. A pair of wire frames with their center edges supported in a fashion similar to the guide rails shown in FIGS. 6b and 6c with central guide rails similar to guide rail 42. This permits styrofoam to be separated out from trash, generally and the pivoted doors for trash 16TD' and a similar pivoted door for styrofoam 16TD" provided. In this case, a pair of pivoted doors 16' and 16" may be provided with their corresponding hinges 18' and 19'.

Figure 9:
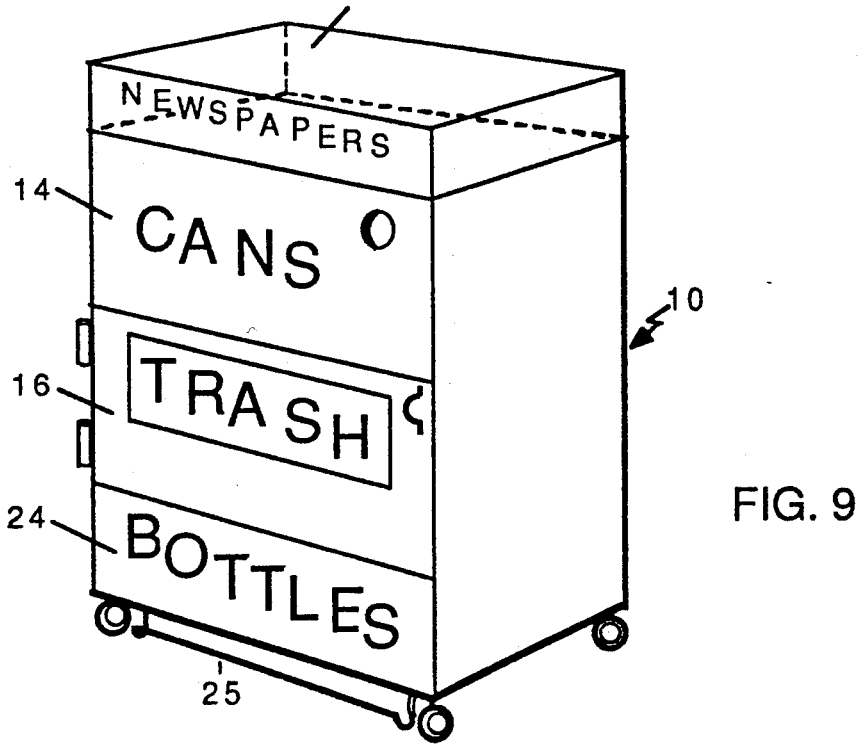
Figure 2:
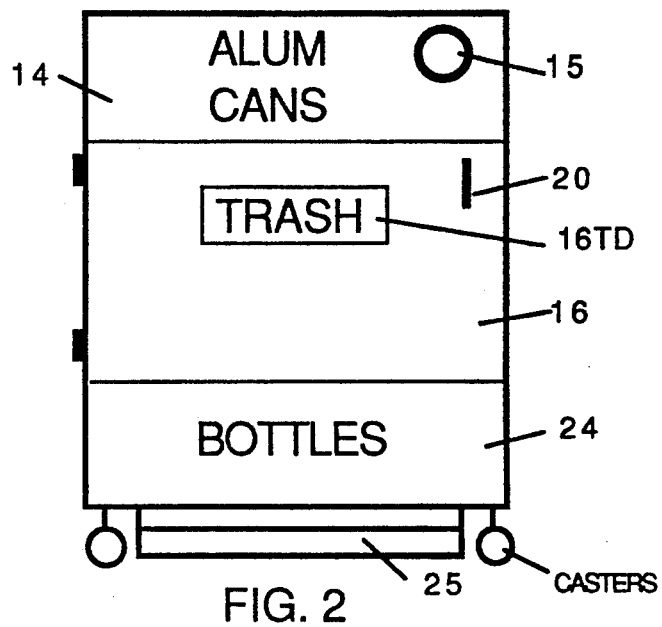
FIG. 2 is a front elevational view thereof.

Finally, in FIG. 9, there is shown a further embodiment of the invention wherein a newspaper storage drawer 60 is provided on the top above the metal can storage area 11.

While there has been shown and described preferred embodiments of the invention, it will be appreciated that various other modifications and adaptations of the invention will be readily apparent to those skilled in the art and such adaptations and modifications of the invention may be made therein without departing from the true spirit and scope of the invention as defined by the following claims.

What is claimed is:

1. A trash collection and sorting system having a vertically extending main housing having left and right sidewalls and a plurality of individual vertically stacked storage volumes in said main housing, said individual storage volumes being adapted to receive a particular category of trash, one of said storage volumes being for miscellaneous trash and including a plastic trash bag in said miscellaneous trash storage volume, and means maintaining said plastic trash bag open, including a left guide track secured to said left sidewall and a right guide track secured to said right sidewall, an endless loop wire frame having a generally rectangular configuration and including front and rear bars joined at their respective ends by left and right side rails, said left and right side rails being slidably receivable in said left and right guide tracks, respectively, and left and right bails slidable on said front and rear bars of said endless loop wire frame proximate the left and right sidewalls, respectively, for securing opposing sides of the open end of said plastic trash bag thereto.

2. The trash collection and sorting system defined in claim 1 wherein at least one of said individual storage volumes is adapted to receive glass bottles, jars and containers, said at least one of said individual storage volumes including chute and a baffle therein for guiding said glass bottles and jars to the interior thereof and slowing any glass bottle or jar so that it has insufficient energy when it impacts previously deposited glass containers therein such that there is no breakage of glass.

3. The trash collection and sorting system defined in claim 1 including a newspaper storage volume storage compartment above said miscellaneous trash storage volume.

4. The trash collection and sorting system defined in claim 1, including an individual storage volume for metal cans, including a cover having a hole therein of a predetermined size for receiving metal cans, and a ramp guide in said individual storage volume for the metal cans for stacking said metal cans to conserve space therein.

* * * * *